Aug. 18, 1964 K. S. T. JANSON ETAL 3,145,340

AUTOMATIC ERROR CONTROL ARRANGEMENT FOR PULSE TRANSMISSION

Filed April 10, 1962

INVENTOR.
K.S.T. JANSON
M.V.I. JEPPSSON
BY K.E.S. SILVERSJO

ATTORNEY 3,145,340

AUTOMATIC ERROR CONTROL ARRANGEMENT FOR PULSE TRANSMISSION

Knut Stig Torbjörn Janson, Stockholm, Martin Vilhelm Ivan Jeppsson, Spanga, and Kurt Elof Samuel Silversjö, Stockholm, Sweden, assignors to International Standard Electric Corporation, New York, N.Y., a corporation of Delaware Filed Apr. 10, 1962, Ser. No. 186,540
Claims priority, application Sweden, Apr. 10, 1961, 3,737/61
4 Claims. (Cl. 325—41)

The present invention relates to equipment for automatic error control and possibly also error correction in connection with intelligence transmission in order to render such transmission more effective and/or to simplify the means required therefor.

The invention will be described more in detail with reference to the accompanying drawing, in which.

Figure 1:
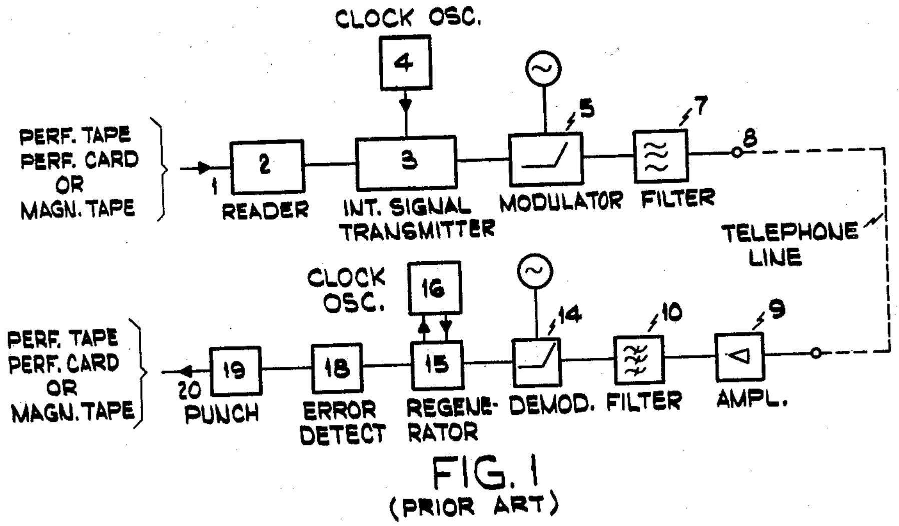
FIG. 1 (PRIOR ART)
FIG. 1 illustrates a prior data transmission system.

A highly simplified block diagram of a conventional arrangement for intelligence transmission is shown in FIG. 1. The contents of each of the labeled rectangular blocks are well-known in the transmission field. The details of these well-known items of apparatus may be found in Bell Telephone Laboratories Publication "Transmission System for Communications," volumes I and II, copyrighted in 1959; in the book "Understanding Digital Computers" by Paul Siegel, published in 1960 by John Wiley & Sons; and in the publication "Basic Carrier Telephony" by David Talley, Rider Publication No. 258.

Perforated tapes, cards or magnetic tapes 1, wherein is stored, in binary form, information to be transmitted, are read by a reading device 2 in which such information is converted into binary direct current signals substantially in parallel form.

In an intelligence signal transmitter 3 these signals (signal elements, bits) are converted from parallel to serial form. During transmission in parallel form the information is utilized in such a manner, that the individual signal elements of a word are transmitted simultaneously on separate lines or channels, whereas during transmission in serial form the individual signal elements are transmitted the one after the other on the same line or the same channel. A specific clock pulse oscillator 4 controls the transmitter 3, so that the direct current intelligence signals are supplied to a modulator 5 at a predetermined speed. The modulator effects conversion of said information into alternating current suitable for line transmission, whereby not desired frequency components are filtered out in a filter 7, before said information is impressed on the transmission medium 8, e.g. a telephone line.

The information thus transmitted in ordinary manner over the telephone line 8 is then amplified in an amplifier 9 to the requisite value at the receiving end, is filtered in the filter 10 and demodulated in the demolulator 14, whereby is obtained binary direct current information in serial form. After demodulation a regeneration may take place in a regenerator 15 under control of a clock pulse oscillator 16 in synchronism with the corresponding clock pulse oscillator at the transmitting end. Then error detection may be carried out in error detector 18 by means of a known type of redundancy control, e.g. parity control, control by cyclic decoding, whereupon the information is caused to actuate a punch 19 or the like acting in well-known manner upon a perforated tape 20 etc. In certain applications information conversion takes place from serial to parallel form.

During transmission the signals may be affected by more or less severe errors in all stages involved and in particular the transmission line is liable to fault occurring therein as disturbances, interruptions or the like. Systems of the type concerned are usually provided with means for error control and/or for correction of errors, in which case some additional information of any type, such as a redundancy, is fed to the intelligence signal transmitter 3 and adapted to be controlled in an error detector 18 inserted at the receiving end after the demodulator 14 and a regenerator 15, if any. Generally different types of conventional redundancy control devices are used for this purpose, whereby the message concerned is divided into groups, so-called blocks, comprising a certain number e.g. of 100 signal elements (bits) and the error detector 18 is caused to check that each block is correct. Other methods are also applicable, for example the use only of certain character code combinations among the possible total of such combinations in accordance with the so-called "2 of 5 code," whereby the error detector 18 is adapted solely to accept and admit these certain code combinations. Means of this nature operate very satisfactorily when merely individual errors or faults occur in each block, while difficulties are encountered if a plurality of errors are comprised in these blocks, particularly when they follow in more or less close sequence with respect to one another. In order to provide a possibly broad safeguard against such events there has been introduced an additional redundancy and also more reliable methods of redundancy control have been applied. However, the heretofore known arrangements utilized for these purposes have been rather bulky and complicated without having resulted in full security during operating conditions.

The present invention relates to improvements in the field outlined in the foregoing. Provided, that the entire equipment both at the transmitting and the receiving end operates perfectly in every respect, it has been and will be evidenced that the major part of errors or faults occurring in close mutual sequence, i.e. only slightly spaced apart, have been caused in response or due to more or less short periods of interruption or disturbance on the transmission line. By way of an example it may be mentioned that on telephone lines, short interruptions may occur with a duration of a magnitude of some tens of a millisecond and that corresponding periods of diturbance likewise have been observed. In this case and at a transmission speed of e.g. 1000 Bauds or signal elements per second about ten consecutive signal elements may be affected by faults, when the fault condition persists over a period of 10 milliseconds. It is obvious that errors thus caused are rather troublesome and that means for their entire elimination cannot be rendered available with the aid of such means as parity control devices or the like.

In intelligence transmission a great variety of different methods of modulation are in use and it is the object of this invention to propose such methods of modulation, as phase modulation, frequency modulation and, in particular, so-called phase-shift modulation, which provide for approximately constant amplitude of the line signal. The last-named type of these methods is charateristic of that the line signal oscillates between different frequencies in rhythm with the line signal.

In accordance with the invention the signal transmission is controlled with respect to periods of interruptions and disturbances at the receiving end of the system in that the amplitude or level of the transmitted signal is checked whether or not its value is within predetermined boundary values or limits. Such limits shall with some margin correspond partly to the minimum level which the signal may assume in the absence of interruptions and partly to maximum level, corresponding to the sum of the normal maximum signal plus maximally permissible disturbance. If error detection is performed solely by level control in accordance with this invention, accidental faults or errors may still occur due to various imperfections of equipment and transmission facilities, and if further parity control or the like is employed, the means therefor may obviously be simplified for attaining either the same safety as without the present invention or a considerably increased safeguard against errors or faults.

The invention will now be more closely described with reference to FIG. 2 of the drawing.

Figure 2:
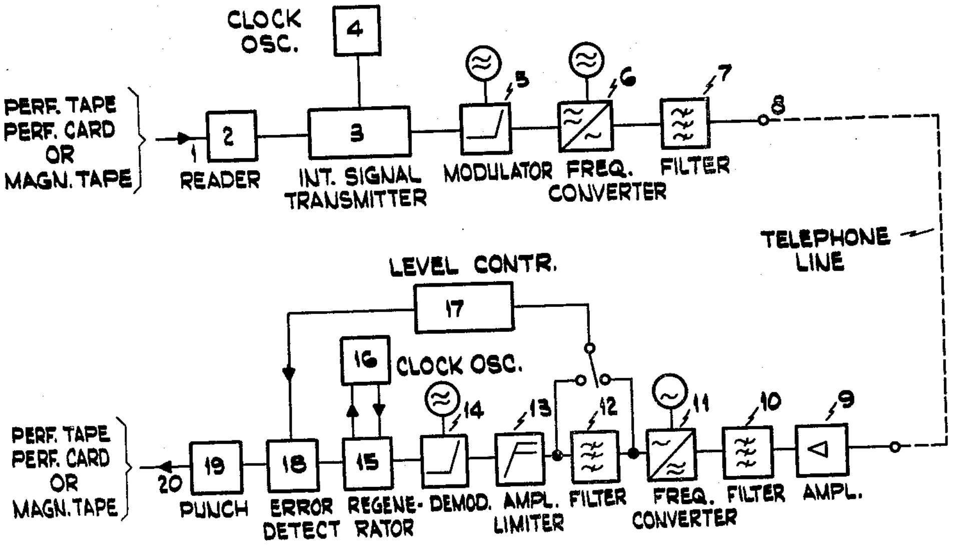
FIG. 2 illustrates the invention.

This FIG. 2 differs from the representation of FIG. 1 in one respect in that there has been added in the block diagram of FIG. 2 an arrangement 17 for level control in advance of the demodulator 14 inlet, and the object of this arrangement is to control that the level of the received signal lies between an upper and a lower boundary value, whereby said arrangement may be composed of e.g. conventional level control means including a rectifier for the received signal and a measuring device wherein the resulting rectified potential will be compared with two steady direct potentials so as to determine if said potential lies between these two values. If this is not the case, a signal is applied to the error detector 18 which identifies the just received signal as being erroneous. In such an event the error affected block must be transmitted once again.

The time interval of integration of the level control means, i.e. the shortest period of disturbance and/or interruptions measurable by said means, should with reference to the foregoing be chosen as short as possible so as maximally to correspond to the duration of one signal element. Since the signals are transmitted over the line by means of alternating current, the integration time cannot likely be chosen shorter than the time interval of one half period at the lowest frequency. Let it now be assumed by way of an example that signal shall be transmitted at a speed of 3000 Bauds by means of frequency-shift modulation.

By selecting the two extreme frequencies to 500 and 3500 cycles per second on the transmission line the half periods of the lowest frequency will then in time correspond to one millisecond during which three signal elements are transmitted. Thus, two contradictory requirements are involved. However, for other reasons it is a commonly applied measure to provide frequency converting means 11 in the receiving apparatus for subjecting the line signal to a frequency shift in advance of the demodulator 14 by its modulation with a suitably selected carrier frequency. Frequency converting means 6, similar to the frequency converting means 11 is also provided in the transmitting apparatus or terminal. If this carrier frequency is made equal to 9.5 kilocycles per second and the upper side band is selected, the two extreme frequencies will be shifted to 10.0 and 13.0 kilocycles per second, respectively. Then the half periods of the lower frequency merely correspond to 0.05 millisecond, and if level control is provided after the modulator there will be no difficulties whatsoever to select the integration time so as to accord with the desired magnitude of ⅓ millisecond which corresponds to one signal element at 3000 Bauds.

The clock pulse oscillator 16 at the receiving end as shown in FIGS. 1 and 2 is frequency controlled in response to the received signals to perfect synchronism with signal elements the transmitted data flow. The clock pulse oscillator requires a given period of initial transients at the commencement of the transmission so as to be correctly synchronized and phased and maintains thereafter this synchronism during a given period of final transients of, say one second, e.g. during an interruption of transmission.

In cases where the duration of an interruption or disturbance should exceed the period of final transients the clock pulse oscillator 16 at the receiving end will no longer be in synchronism with signals received after the interruption, until a new period of initial transients has commenced. This implies that it is advantageous in connection with level control to control the time of an interruption and disturbance, respectively, by means of arrangements known per se. If this time should exceed the period of final transients, errors or faults affecting to received signals shall be indicated and/or marked also in the course of this additional period of time, which shall be at least equal to the initial period of transients of the clock pulse oscillator 16.

The present invention may be utilized in combination with the arrangement disclosed in U.S. patent application, Serial No. 186,539, filed April 10, 1962, and entitled "Control Arrangement for Intelligence Transmission."

We claim:

1. In an intelligence transmission system for transmitting a plurality of data signal elements from a sender terminal to a receiver terminal and for error-checking the said transmission, means in the sender terminal for receiving, modulating and frequency-shifting said data signal elements and for transmitting, at a constant amplitude, said resultant signal elements to said receiver terminal, means in said receiver terminal, for frequency-shifting the said transmitted signal elements, detecting the amplitude of said transmitted and frequency-shifted signal elements prior to demodulation, and for indicating a transmission error responsive to the amplitude of the last-said signal element lying outside of predetermined amplitude limits, the said means for detecting including signal integrating means having a period of integration not greater than the duration of one signal element.

2. In an intelligence transmission system for transmitting a plurality of data signal elements from a sender terminal to a receiver terminal and for error-checking the said transmission, means in the sender terminal for receiving, modulating and frequency-shifting said data signal elements and for transmitting, at a constant amplitude, said resultant signal elements to said receiver terminal, means in said receiver terminal for frequency-shifting the said transmitted signal elements, detecting the amplitude of said transmitted and frequency-shifted signal elements prior to demodulation and for indicating a transmission error responsive to the amplitude of the last-said signal elements lying outside of predetermined amplitude limits, the said means for detecting including signal integrating means having a period of integration equal to the period of time corresponding to a whole number of half periods of the lowest frequency of said frequency-shifted signal elements.

3. In an intelligence transmission system for transmitting a plurality of data signal elements from a sender terminal to a receiver terminal and for error-checking the said transmission, means in the sender terminal for receiving, modulating and frequency-shifting said data signal elements and for transmitting, at a constant amplitude, said resultant signal elements to said receiver terminal, means in said receiver terminal for frequency-shifting the said transmitted signal elements, detecting the amplitude of said transmitted and frequency-shifted signal elements prior to demodulation, and for indicating a transmission error responsive to the amplitude of the last-said signal elements lying outside of predetermined amplitude limits, the said means for detecting including signal integrating means having a period of integration not greater than the duration of one signal element, and equal to the period of time corresponding to a whole number of half periods of the lowest frequency of said frequency shifted signal elements.

4. An intelligence transmission system as set forth in claim 1 wherein the said means for indicating a transmission error includes timing means for blocking said error indication responsive to the amplitude of said detected signal elements lying outside of said predetermined limits for less than a predetermined time interval.

References Cited in the file of this patent

UNITED STATES PATENTS

| | | |
|---|---|---|
| 2,928,897 | Koolhof | Mar. 15, 1960 |
| 3,008,005 | Barry et al. | Nov. 7, 1961 |
| 3,069,497 | Hennig | Dec. 18, 1962 |

OTHER REFERENCES

Freiman: "Variable Threshold Error Correction," IBM Tech. Disclosure Bulletin, vol. 4, No. 7, December 1961, p. 102.